United States Patent [19]

Nordsiek et al.

[11] Patent Number: 4,756,353
[45] Date of Patent: Jul. 12, 1988

[54] LOW ROLLING RESISTANCE TIRE TREAD

[75] Inventors: Karl-Heinz Nordsiek; Helmut Schwesig, both of Marl, Fed. Rep. of Germany

[73] Assignee: Huels Aktiengesellschaft, Marl, Fed. Rep. of Germany

[21] Appl. No.: 16,958

[22] Filed: Feb. 20, 1987

[30] Foreign Application Priority Data

Jul. 5, 1984 [DE] Fed. Rep. of Germany ....... 3424732

[51] Int. Cl.$^4$ .......................... B60C 1/00; C08L 9/00; B29H 17/36
[52] U.S. Cl. ................................ 152/209 R; 523/212; 524/496; 524/505; 525/232; 525/236; 525/237
[58] Field of Search ...................... 152/209 R, 330 R; 523/212; 524/496, 505; 525/232, 236, 237

[56] References Cited

U.S. PATENT DOCUMENTS

| | | | |
|---|---|---|---|
| 4,224,197 | 9/1980 | Veda et al. | 525/237 |
| 4,321,168 | 3/1982 | Veda et al. | 524/526 |
| 4,334,567 | 6/1982 | Bond | 526/340 |

FOREIGN PATENT DOCUMENTS

| | | |
|---|---|---|
| 0095629 | 5/1983 | European Pat. Off. |
| 122907 | 7/1983 | Japan. |
| 2083486 | 3/1982 | United Kingdom. |
| 2102015 | 1/1983 | United Kingdom. |

OTHER PUBLICATIONS

Derwent Abstract, 39922E/20, Toyo Rubber J57057735 (4-1982); Derwent Abstract, 44415E/22 Sumitomo J57065736 (4-1982).
Derwent Abstract, 25157E/13, Bridgestone J57031943 (2-1982).
Derwent Abstract, 83-834044/49, Chem Werke De 3310118 (12-1983).
Derwent Abstract, 20497 E/11 Yokohama Rubber J57021436 (2-1982).
Derwent Abstract, 73523 E/35 Japan Geon J57119938 (7-1982).

*Primary Examiner*—Herbert J. Lilling
*Attorney, Agent, or Firm*—Millen & White

[57] ABSTRACT

Tire treads having
(a) low heat buildup under dynamic stress and a low frictional resistance to rolling,
(b) adequate damping and accordingly a high wet skid resistance,
(c) high abrasion resistance and accordingly high wearing efficiency, are produced from vulcanizable compositions based on an elastomer component containing an isoprene polymer characterized by a high content of recurring units obtained by 1,2- and 3,4-polymerization of isoprene.

17 Claims, No Drawings

LOW ROLLING RESISTANCE TIRE TREAD

This application is a continuation, of application Ser. No. 684,400 filed Dec. 20, 1984, now abandoned.

BACKGROUND OF THE INVENTION

This invention relates to tire tread strips and elastomeric compositions for producing same.

Increased efforts have been made in recent years by the tire industry to reduce the frictional rolling resistance of treads of pneumatic automobile tires, in order to meet the urgent need for decreased fuel consumption.

Tire treads must have a satisfactory spectrum of usage qualities, which can be described by the following combination of properties:

(a) low heat buildup under dynamic stress and a correspondingly low frictional resistance to rolling, accompanied by a small amount of consumed energy and accordingly by low fuel consumption (economy);

(b) adequate damping and accordingly a high wet skid resistance (safety);

(c) high abrasion resistance and accordingly high wearing efficiency (economy).

This combination of properties is insufficiently realized by the tread strips of the prior art (DOS's 2,843,794, 3,133,544, and 3,151,139; German Patent No. 3,217,622; British patent application No. 2,090,840; U.S. Pat. No. 4,414,363).

SUMMARY

It is thus an object of the invention to provide improved heat-vulcanizable tread strips for pneumatic tires, especially automobile tires, taking into consideration the combination of properties described above.

Another object is to provide novel vulcanizable compositions for the production of such tread strips.

Still another object is to provide novel mixtures of elastomers, especially for the production of such tread strip compositions.

Further objects are to provide an elastomeric mixture having satisfactory processability during the blending and shaping step of the vulcanizable compositions, as well as satisfactory vulcanization characteristics for producing tread strips, such as the rate of vulcanization and degree of crosslinking during the further processing into the tire treads.

Upon further study of the specification and appended claims, further objects and advantages of this invention will become apparent to those skilled in the art.

To attain these objects, according to one aspect of this invention, there are provided heat-vulcanizable tread strips for the production of pneumatic tire treads for motor vehicles, obtained from vulcanizable compositions consisting essentially of:

an amorphous elastomer component which exhibits a Mooney viscosity ($ML_{1+4}$, 100°0 C., DIN 53 523) of 30–130;

40–50% by weight of active, reinforcing filler which comprises one or more tread carbon blacks or a mixture of 80–95% by weight of one or several tread carbon blacks and 5–20% by weight of one or several active silicic acids treated with silane adhesion promoters;

0–20% by weight of plasticizer oil which comprises conventional aromatic, aliphatic and naphthenic hydrocarbons, based on the elastomer component, an effective amount of a vulcanizing agent, and conventional additives in effective amounts, wherein a. the elastomer component consists essentially of a mixture of in percent by weight based on the total mixture, a.1.1 20–40% by weight of a polyisoprene I, a.1.2 20–80% by weight of a polybutadiene I, wherein the polyisoprene I and the polybutadiene I are optionally present as blocks in a block copolymer, a.2.1 0–30% by weight of a polybutadiene II, a.2.2 0–50% by weight of an elastomer selected from the group consisting of 1,4-cis-IR and NR (polyisoprene II), and a.2.3 0–60% by weight of SBR with 10–25% by weight recurring units, obtained by polymerization of styrene, excluding styrene blocks;

b. the elastomer component has a defo elasticity (80° C., DIN 53 514) of 12–45 and a nonuniformity $(U=(Mw/Mn)-1)$ of 0.8–5.5;

c.1 the polyisoprene I, the polybutadiene I, and the block copolymer have been obtained by polymerization in an inert, organic solvent in the presence of an organolithium catalyst and a Lewis base from the group of the ethers, tertiary amines, and their mixtures as the cocatalyst;

c.2 the polyisoprene I and the corresponding block in the block copolymer consist essentially of 55–85% by weight of recurring units obtained by 1,2- and 3,4-polymerization, and 15–45% by weight of recurring units obtained by 1,4-polymerization of isoprene;

c.3 the polybutadiene I and the corresponding block in the block copolymer consist essentially of 40–70% by weight of recurring units obtained by 1,2-polymerization, and 30–60% by weight of recurring units obtained by 1,4-polymerization of 1,3-butadiene, c.4 the polybutadiene II is obtained by Ziegler polymerization; it consists essentially of $\leq 10\%$ by weight of recurring units obtained by 1,2-polymerization and $\geq 90\%$ by weight of recurring units obtained by 1,4-polymerization of 1,3-butadiene.

Preferred tread strips in relation to the above are obtained from compositions wherein:

d.1 the polyisoprene I and the corresponding block in the block copolymer consist essentially of 65–75% by weight of recurring units obtained by 1,2- and 3,4-polymerization, and 25–35% by weight of recurring units obtained by 1,4-polymerization of isoprene;

d.2 the polybutadiene I and the corresponding block in the block copolymer consist essentially of 50–60% by weight of recurring units obtained by 1,2-polymerization, and 40–50% by weight of recurring units obtained by 1,4-polymerization of 1,3-butadiene.

An aspect of this invention is also to provide vulcanized tire treads based on the vulcanizable tire treads described above, integral with vehicular tires and the like.

Polybutadiene I and the block copolymer exhibit long-chain branchings in case of high polymerizing temperatures ($>90°$ C.). These long-chain branchings are desirable with a view toward a low cold flow. If the long-chain branchings are insufficient, the polymerization can be conducted in the presence of branching agents, for example in the presence of 0.02–0.08% by weight of divinylbenzene, based on polybutadien I and/or on the block copolymer, or in the presence of tertiary butyl chloride. By satisfactory branching is meant branching to such an extent as to yield an elastomer having low cold flow, i.e., bales of polybutadiene I and of the block copolymer should meet the requirements for transportation and storage (dimension stability).

The aforementioned remarks concerning the incorporation of branching agents also apply analogously to polyisoprene I.

The recurring units obtained by 1,2- and 3,4-polymerization and by 1,4-polymerization of the dienes are determined by IR analysis.

In general, polyisoprene I, polybutadiene I, and the block copolymer are obtained by polymerization of the monomers in a hydrocarbon solvent in the presence of a polymerization-active amount of 0.02–0.08% by weight of a C$_4$-alkyllithium, especially n-butyllithium, as the catalyst, and 0.2–2% by weight of a bifunctional Lewis base selected from the group of ethers, tertiary amines, and mixtures thereof as the cocatalyst (based on the polymerized elastomer), with a weight ratio of cocatalyst/catalyst of 3:1 to 200:1.

Preferably a block copolymer is used instead of a mixture of homopolymers because it is advantageous to reduce the number of blend components in the elastomer component.

Polybutadiene II is obtainable by conventional methods (see, for example, "Hydrocarbon processing", Vol. 44, No. 11, Nov. 1965, p. 260), and is preferably obtained by Ziegler polymerization with a cobalt catalyst.

The SBR is obtained, for example, by conventional emulsion polymerization or, in case of vinyl-SBR, by solution polymerization, e.g., by the process described in DOS 2,843,794, for example.

The SBR consists of 10–25% by weight of recurring units, obtained by polymerization of styrene and 75–90% by weight of recurring units, obtained by polymerization of 1,3-butadiene, i.e. the SBR may be obtained by any kind of copolymerization of styrene and 1,3-butadiene as far as styrene blocks are excluded.

The following preferred ranges apply for the Mooney viscosities of the polymers on which the elastomer component is based:
polyisoprene I: 60–110, especially 75–90;
polybutadiene I: 35–70, especially 45–55;
block copolymer: 40–100;
polyisoprene II: 60–110, especially 75–90.

The elastomer component normally consists essentially of no more than four, preferably no more than three blend components, a block copolymer being considered as a single component.

If a blend component is employed which is considered optional, then its amount preferably is ≧10% by weight, because it is advantageous to reduce the number of blend components in the elastomer component.

Active reinforcing fillers are, for example, tread carbon blacks of varying activity, especially those from the N-300 series (ASTM), and their mixtures with active silicic acids treated with silane adhesion promoters.

The vulcanizing agents are intended to include conventional vulcanizing systems. A preferred vulcanizing system contains sulfur in combination with the usual accelerators. The amount of vulcanizing agent depends on the other components of the blend and can be readily determined by simple routine experiments.

As the additive, conventional auxiliary agents can be added in effective amounts, such as, for example, rosin acids, antiaging agents, and ozone-protection waxes.

For producing the vulcanizable compositions from its components and for the further processing into the tread strips and the vulcanized products (tire treads), the mixing, shaping, and vulcanizing equipment conventional in the tire industry can be employed, such as, for example, internal mixers, rolling mills, extruders, calenders, injection-molding devices, vulcanizing presses, and continuously operating crosslinking installations.

The tread strips of this invention are suitable for manufacturing the treads of passenger car and truck tires, namely in the production of new tires as well as retreads for old tires.

This invention is particularly suitable for manufacturing treads for truck tires in view of the extraordinarily high network stability of the tire treads during dynamic stress.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the following examples, parts (p) mean parts by weight. The comparative examples, the vulcanizable compositions, test specimens, and test tires which are not in accordance with this invention are denoted by capital letters.

The elastomers employed were:
SBR 1712 (IISRP), Mooney viscosity: 50.
Vinyl-SBR, Mooney viscosity: 50; 20% by weight recurring units obtained by polymerization of styrene, 40% by weight recurring units obtained by 1,2-polymerization, and 40% by weight recurring units obtained by 1,4-polymerization of 1,3-butadiene (available in accordance with DOS 2,843,794; commercial grade).
Polybutadiene Ia, Mooney viscosity: 50; 50% by weight recurring units obtained by 1,2-polymerization and 50% by weight recurring units obtained by 1,4-polymerization of 1,3-butadiene.
Polybutadiene Ib, Mooney viscosity: 50; 60% by weight recurring units obtained by 1,2-polymerization and 40% by weight recurring units obtained by 1,4-polymerization of 1,3-butadiene.
Polyisoprene Ia, Mooney viscosity: 85; 63% by weight recurring units obtained by 1,2- and 3,4-polymerization and 37% by weight recurring units obtained by 1,4-polymerization of isoprene.
Polyisoprene Ib, Mooney viscosity: 85; 74% by weight recurring units obtained by 1,2- and 3,4-polymerization and 26% by weight recurring units obtained by 1,4-polymerization of isoprene.
NR, degraded to a Mooney viscosity of 75.

Preparation of the Compounds (vulcanizable compositions)

EXAMPLE 1 (Compound 1)

A basic mixture was first prepared in a laboratory kneader (type GK 2) in accordance with the following formulation:

| | |
|---|---|
| Elastomer component | 100 p |
| Carbon black N-339 | 45 p |
| Antiaging agent (N—phenyl-N'—isopropyl-p-phenylenediamine) | 2 p |

-continued

| Zinc oxide | 3 p |
| Stearic acid | 2 p |

After a storage period of 6 hours, the vulcanizing agent was incorporated, consisting of

| Sulfur | 1.9 p |
| N—Cyclohexyl-2-benzothiazole-sulfenamide (CBS) | 0.6 p |

The elastomer component utilized consisted of 66.7 p polybutadiene Ia and 33.3 p polyisoprene Ib.

EXAMPLE 2 (Compound 2)

As in Example 1, except that the elastomer component consisted of respectively 33.3 p polybutadiene Ia, polyisoprene Ib, and NR.

EXAMPLE 3 (Compound 3)

As in Example 1, except that the elastomer component consisted of 75 p polybutadiene Ib and 25 p polyisoprene Ib and the vulcanizing agent consisted of 1.8 p sulfur and 0.7 p CBS.

EXAMPLE 4 (Compound 4)

As in Example 1, except that the elastomer component consisted of 50 p polybutadiene Ib, 25 p polyisoprene Ib, and 25 p NR, and the vulcanizing agent consisted of 1.9 p sulfur and 0.6 p CBS.

EXAMPLE 5 (Compound 5)

As in Example 1, except that the elastomer component consisted of 60 p polybutadiene Ib and 40 p polyisoprene Ia, and the vulcanizing agent consisted of 1.8 p sulfur and 0.7 p CBS.

EXAMPLE A (Compound A)

As in Example 1, but the basic mixture was produced according to the following formulation:

| SBR 1712 | 137.5 p |
| Carbon black N-339 | 75 p |
| Plasticizer oil (aromatic hydrocarbon) | 3 p |
| Antiaging agent, zinc oxide, and stearic acid as in Example 1 | |

The vulcanizing agent consisted of 2 p sulfur, 0.2 p diphenylguanidine, and 1.5 p CBS.

EXAMPLE B (Compound B)

As in Example 1, except that vinyl-SBR was used as the elastomer component. The vulcanizing agent consisted of 2 p sulfur and 1 p CBS.

PRODUCTION OF THE TEST SPECIMENS AND TEST TIRES

Under crosslinking conditions of 30 min/150° C., the vulcanized test specimens 1 through 5, A, and B were obtained from compounds 1 through 5, A, and B. They were characterized as indicated in Table 1.

It is to be emphasized that the abrasion of the test specimens of this invention attains the level of the state of the art.

In a comparison of the rebound resiliencies of the test specimens of this invention with those of the prior-art test specimens, the fact stands out that the former, at 20° C., are smaller than or equal to, and at 75° C., higher than the latter.

Tire tests were conducted for further investigation. First of all, the frictional resistance to rolling was determined on a suitable test stand for commercially available tires of the dimension 175 SR 14. Then the treads were removed down to a rough depth to be exactly maintained, and the tread strips from compounds 1–5, A, and B were applied in exactly the same thickness. Under crosslinking conditions of 35–41 minutes at 154° C. shaping temperature and 120° C. skin temperature, the test tires 1–5, A, and B were obtained. The frictional resistance to rolling was determined and, in each case, the difference was calculated with respect to the frictional rolling resistance of the original tire. The difference in case of test tire A was set to be equal to 100. The differences of the other tires were brought into relation therewith. (Evaluation by means of index figures, Table 2; high index means high frictional resistance to rolling.)

The same tires were subjected, using a BMW 735i as the test vehicle, to a skid test on a wet asphalt roadway (ambient temperature 15° C.). Braking took place by blockage of the front wheels. The wet skid resistance of test tires A was evaluated as 100. The measured data for the other tires were related therewith (evaluation with index figures, Table 2; high index means high wet skid resistance).

The test tires 1–5, obtained with the tread strips of this invention, exhibit, as compared with the prior-art test tires A and B, a markedly improved (reduced) frictional resistance to rolling, without an impairment (lowering) in wet skid resistance.

For economic reasons (polyisoprene I is less easily available and therefor more expensive than polybutadiene I) compound 5 is less preferred. (It does not correspond to d.1 in claim 2).

TABLE 1

| Practical Usage Properties of Vulcanized Test Specimens | | | | | | | |
| --- | --- | --- | --- | --- | --- | --- | --- |
| Test Specimens | 1 | 2 | 3 | 4 | 5 | A | B |
| Tensile strength (DIN 53 504), [MPa] | 13.9 | 16.0 | 14.5 | 15.5 | 14.8 | 18.1 | 17.5 |
| Ultimate elongation (DIN 53 504), [%] | 390 | 436 | 405 | 425 | 415 | 516 | 420 |
| Modulus at 300% elongation (DIN 53 504), [MPa] | 9.6 | 9.5 | 9.8 | 9.5 | 9.4 | 9.5 | 9.9 |
| Shore hardness A, 20° C. | 64 | 63 | 65 | 63 | 64 | 63 | 65 |
| Rebound resilience, 20° C. (DIN 53 512), [%] | 30 | 30 | 27 | 28 | 32 | 32 | 36 |
| Rebound resilience, 75° C. (DIN 53 512), [%] | 64 | 64 | 65 | 64 | 63 | 51 | 58 |
| Damping, 20° C., 1 Hz | 0.209 | 0.200 | 0.225 | 0.210 | 0.190 | 0.180 | 0.150 |

TABLE 1-continued

| Practical Usage Properties of Vulcanized Test Specimens | | | | | | | |
|---|---|---|---|---|---|---|---|
| Test Specimens | 1 | 2 | 3 | 4 | 5 | A | B |
| (Rheovibron), tan δ Damping, 60° C., 1 Hz | 0.082 | 0.073 | 0.080 | 0.075 | 0.085 | 0.117 | 0.100 |
| (Rheovibron), tan δ Abrasion (DIN 53 516), [mm$^3$] | 117 | 126 | 110 | 129 | 119 | 131 | 127 |
| Dynamic heating (ball wear according to Martens (*) [°C.] | | | | | | | |
| 2,000 rev./15 min, 150 N | 84 | 85 | 81 | 85 | 84 | 106 | 96 |
| 4,000 rev./30 min, 200 N | 117 | 116 | 112 | 113 | 116 | 135 | 122 |
| 6,000 rev./45 min, 250 N | 132 | 141 | 128 | 138 | 130 | 164 | 156 |

(*) Hauser, "Handbuch der Kautschuktechnologie" [Manual of Rubber Technology] vol. 1 (1934), p. 119

TABLE 2

| | Tire Tests | | | | | | |
|---|---|---|---|---|---|---|---|
| Test Tires | 1 | 2 | 3 | 4 | 5 | A | B |
| Frictional resistance to rolling | 83 | 85 | 83 | 85 | 85 | 100 | 90 |
| Wet skid resistance | 100 | 102 | 104 | 100 | 103 | 100 | 94 |

We claim:

1. Heat-vulcanizable tread strips for the production of pneumatic tire treads for motor vehicles, obtained from vulcanizable compositions consisting essentially of:
   an amorphous elastomer component which exhibits a Mooney viscosity of 30-130;
   40-60% by weight of active, reinforcing filler which comprises one or more tread carbon blacks or a mixture of 80-95% by weight of one or several tread carbon blacks and 5-20% by weight of one or several active silicic acids treated with silane adhesion promoters;
   0-20% by weight of plasticizer oil which comprises conventional aromatic, aliphatic and naphthenic hydrocarbons, based on the elastomer component, and
   an effective amount of a vulcanizing agent, wherein
   a. the elastomer component consists essentially of a mixture of blend components, said mixture of blend components consisting essentially of in percent by weight based on the total mixture,
   a.1.1 20-40% by weight of a polyisoprene I,
   a.1.2 20-80% by weight of a polybutadiene I, wherein the polyisoprene I and the polybutadiene I are present as a mixture of homopolymers or as blocks in a block copolymer,
   a.2.1 0-30% by weight of a polybutadiene II,
   a.2.2 0-50% by weight of an elastomer selected from the group consisting of 1,4-cis-IR and NR (polyisoprene II), and
   a.2.3 0-60% by weight of SBR with 10-25% by weight recurring units, obtained by polymerization of styrene, excluding styrene blocks;
   b. the elastomer component has a defo elasticity of 12-45 and a nonuniformity ($U = Mw/Mn - 1$) of 0.8-5.5;
   c.1 the polyisoprene I, the polybutadiene I, and the block copolymer have been obtained by polymerization in an inert, organic solvent in the presence of an organolithium catalyst and a Lewis base from the group of the ethers, tertiary amines, and their mixtures as the cocatalyst;
   c.2 the polyisoprene I and the corresponding block in the block copolymer consist essentially of 55-85% by weight of recurring units obtained by 1,2- and 3,4-polymerization, and 15-45% by weight of recurring units obtained by 1,4-polymerization of isoprene;
   c.3 the polybutadiene I and the corresponding block in the block copolymer consist essentially of 40-70% by weight of recurring units obtained by 1,2-polymerization, and 30-60% by weight of recurring units obtained by 1,4-polymerization of 1,3-butadiene,
   c.4 the polybutadiene II is obtained by Ziegler polymerization; it consists essentially of ≦10% by weight of recurring units obtained by 1,2-polymerization and ≧90% by weight of recurring units obtained by 1,4-polymerization of 1,3-butadiene.

2. Tread strip according to claim 1, wherein:
   d.1 the polyisoprene I and the corresponding block in the block copolymer consist essentially of 65-75% by weight of recurring units obtained by 1,2- and 3,4-polymerization, and 25-35% by weight of recurring units obtained by 1,4-polymerization of isoprene;
   d.2 the polybutadiene I and the corresponding block in the block copolymer consist essentially of 50-60% by weight of recurring units obtained by 1,2-polymerization, and 40-50% by weight of recurring units obtained by 1,4-polymerization of 1,3-butadiene.

3. A vulcanized tread obtained by vulcanizing a tread strip according to claim 1.

4. A vulcanized tread obtained by vulcanizing a tread strip according to claim 2.

5. A tread strip as defined by claim 1, wherein the elastomer component consists essentially of 66.7 parts polybutadiene I and 33.3 parts polyisoprene I.

6. A tire tread according to claim 1, wherein the elastomer component consists essentially of 75 parts polybutadiene I and 25 parts polyisoprene I.

7. A tread strip according to claim 1, wherein polyisoprene I and polybutadiene I are present as blocks in a block copolymer.

8. A tread strip according to claim 1, wherein polyisoprene I and polybutadiene I are present as a mixture of homopolymers.

9. A tread strip according to claim 8, wherein the polyisoprene I blend component has a Mooney viscosity of 60-110.

10. A tread strip according to claim 8, wherein the polybutadiene I blend component has a Mooney viscosity of 35-70.

11. A tread strip according to claim 7, wherein the block copolymer blend component has a Mooney viscosity of 40-100.

12. A tread strip according to claim 1, wherein the polyisoprene II blend component has a Mooney viscosity of 60-110.

13. A tread strip according to claim 1, wherein said elastomer component consists essentially of no more than four blend components.

14. A tread strip according to claim 1, wherein said elastomer component consists essentially of no more than three blend components.

15. A tread strip according to claim 1, wherein said elastomer component consists essentially of 33.3 parts polybutadiene I, 33.3 parts polyisoprene I and 33.3 parts NR.

16. A tread strip according to claim 1, wherein said elastomer component consists essentially of 50 parts polybutadiene I, 25 parts polyisoprene I and 25 parts NR.

17. A tread strip according to claim 1, wherein said elastomer component consists essentially of 60 parts polybutadiene I and 40 parts polyisoprene I.

* * * * *